United States Patent
Hagi et al.

(10) Patent No.: US 10,618,477 B2
(45) Date of Patent: Apr. 14, 2020

(54) WIRE HARNESS WITH WIRE AND PROTECTIVE MATERIAL

(71) Applicant: SUMITOMO WIRING SYSTEMS, LTD., Yokkaichi-shi, Mie (JP)

(72) Inventors: Masahiro Hagi, Yokkaichi (JP); Hiroshi Inoue, Yokkaichi (JP); Satoshi Sasaki, Yokkaichi (JP); Koki Shiga, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/325,098

(22) PCT Filed: Aug. 30, 2017

(86) PCT No.: PCT/JP2017/031105
§ 371 (c)(1),
(2) Date: Feb. 12, 2019

(87) PCT Pub. No.: WO2018/043542
PCT Pub. Date: Mar. 8, 2018

(65) Prior Publication Data
US 2019/0308571 A1   Oct. 10, 2019

(30) Foreign Application Priority Data
Aug. 31, 2016   (JP) ................................. 2016-168897

(51) Int. Cl.
*H01B 3/50*   (2006.01)
*H01B 7/00*   (2006.01)
(Continued)

(52) U.S. Cl.
CPC ......... *B60R 16/0215* (2013.01); *H01B 3/308* (2013.01); *H01B 3/50* (2013.01);
(Continued)

(58) Field of Classification Search
CPC ...... B60R 16/0215; H01B 3/308; H01B 3/50; H01B 7/0045; H01B 7/20; H01R 13/52;
(Continued)

(56) References Cited

U.S. PATENT DOCUMENTS 9,616,827 B2 *   4/2017   Oga .................... B60R 16/0215
10,148,077 B2 *   12/2018   O'Sullivan ............ H02G 15/04
(Continued)

FOREIGN PATENT DOCUMENTS

JP   2004-171952 A   6/2004
JP   2010-220362 A   9/2010
(Continued)

OTHER PUBLICATIONS

Sep. 26, 2017 International Search Report issued in International Patent Application No. PCT/JP2017/031105.

*Primary Examiner* — Andargie M Aychillhum
*Assistant Examiner* — Michael F McAllister
(74) *Attorney, Agent, or Firm* — Oliff PLC

(57) ABSTRACT

A wire harness that is capable of protecting a wire even if a pipe is damaged includes: a wire disposed in a pipe; and a protective material surrounding and protecting a predefined portion of the wire, the predefined portion being disposed within the pipe. This configuration places the protective material on a portion that is likely to be damaged in the event of, for instance, a collision of a vehicle, thereby capable of protecting the wire even if the pipe is damaged. This configuration is also capable of avoiding the diameter of the pipe being increased for the process of passing the wire through the pipe, because the wire in this configuration is passed through the pipe with greater ease than a wire surrounded by a protective material along its entire length of the wire.

5 Claims, 8 Drawing Sheets

(51) Int. Cl.
*H01B 7/18* (2006.01)
*H01B 7/20* (2006.01)
*H01R 13/52* (2006.01)
*H02G 3/04* (2006.01)
*B60R 16/02* (2006.01)
*H01B 3/30* (2006.01)

(52) U.S. Cl.
CPC ............. *H01B 7/00* (2013.01); *H01B 7/0045* (2013.01); *H01B 7/18* (2013.01); *H01B 7/20* (2013.01); *H01R 13/52* (2013.01); *H02G 3/04* (2013.01); *H02G 3/0406* (2013.01); *H02G 3/0462* (2013.01); *H01R 2201/26* (2013.01)

(58) Field of Classification Search
CPC . H01R 2201/26; H02G 3/0406; H02G 3/0462
USPC ....................................................... 174/72 A
See application file for complete search history.

(56) References Cited

U.S. PATENT DOCUMENTS

| | | | |
|---|---|---|---|
| 2011/0180323 A1* | 7/2011 | Luzzi | H01R 4/01 174/84 R |
| 2015/0287497 A1* | 10/2015 | Shiga | B60R 16/0215 174/84 R |
| 2017/0197564 A1* | 7/2017 | Hagi | B60R 16/0215 |
| 2018/0005726 A1 | 1/2018 | Hiramitsu et al. | |

FOREIGN PATENT DOCUMENTS

| | | |
|---|---|---|
| JP | 2012-222996 A | 11/2012 |
| JP | 2014-050169 A | 3/2014 |
| JP | 2016-154430 A | 8/2016 |

* cited by examiner

WIRE HARNESS WITH WIRE AND PROTECTIVE MATERIAL

TECHNICAL FIELD

The present disclosure relates to a wire harness.

BACKGROUND ART

A known, conventional type of wire harness includes a pipe and wires that are disposed in the pipe for protection. A wire harness described in Patent Document 1, for example, is for installation in a vehicle and includes multiple wires collectively disposed in a pipe for protection.

CITATION LIST

Patent Documents

Patent Document 1: JP 2004-171952A

SUMMARY

Technical Problem

To enhance vehicle safety, there has been the desire in recent years to protect electric wires so as to prevent damage to the wires upon an impact significant enough to break the pipe in the event of, for example, a collision of a vehicle. In other words, there is demand for prevention of damage to the sheaths of the wires even if the pipe is damaged, to thereby avoid situations where the wires may short-circuit.

Preferred embodiments have been achieved in view of the circumstances described above and has an object of providing a wire harness capable of protecting a wire in the event of breakage of a pipe.

Solution to Problem

A wire harness according to one aspect f a preferred embodiment includes: a wire disposed in a pipe; and a protective material surrounding and protecting a predefined portion of the wire, the predefined portion being disposed within the pipe.

Advantageous Effects

The preferred embodiments places the protective material on a portion that is likely to be damaged in the event of, for instance, a collision of a vehicle, thereby capable of protecting the wire even if the pipe is damaged. The present invention is also capable of avoiding the diameter of the pipe being increased for the process of passing the wire through the pipe, because the wire in the present invention is passed through the pipe with greater ease than a wire surrounded by a protective material along the entire length of the wire.

DESCRIPTION OF EMBODIMENTS

Figure 1:
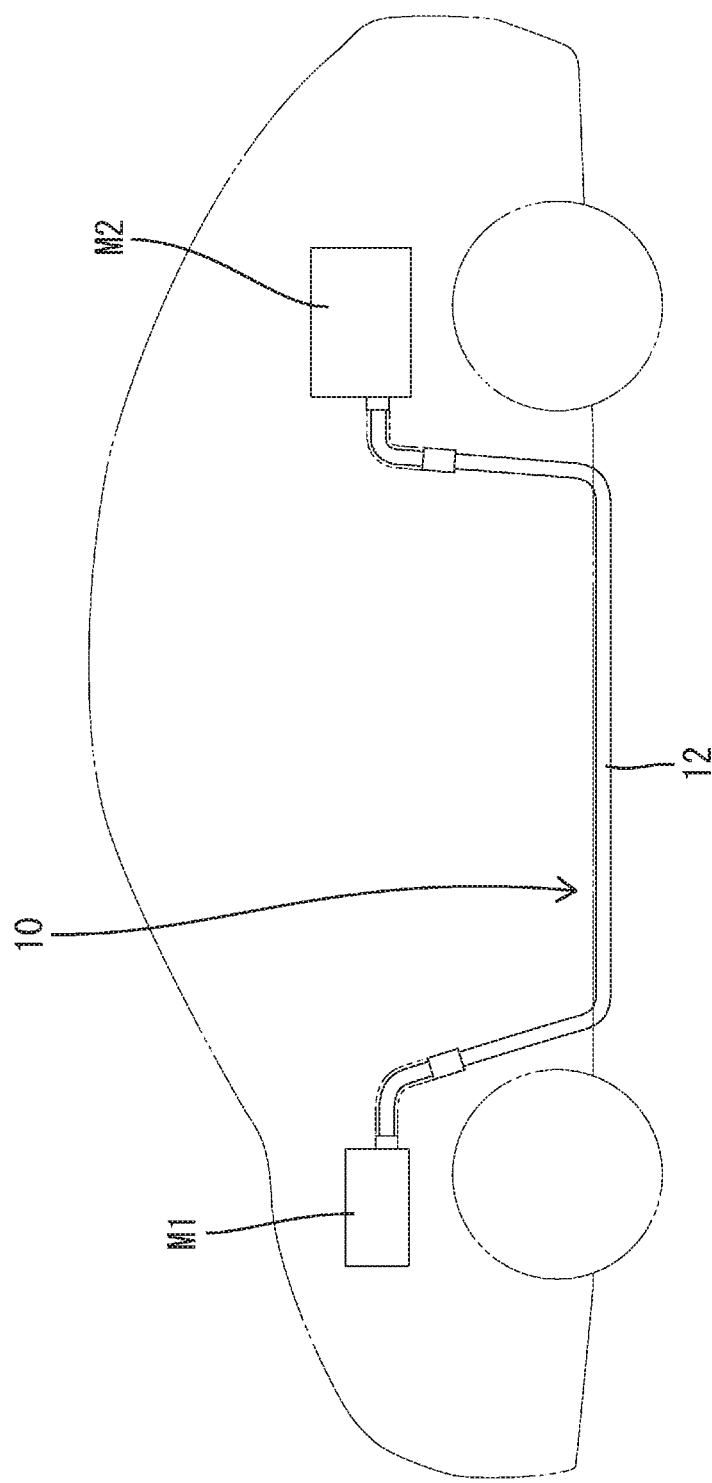
FIG. 1 is a schematic diagram showing a wire harness according to a first embodiment as installed in a vehicle.

Some preferred embodiments are described below.

A wire harness according to a preferred embodiment may include a plurality of wires disposed in the pipe, the protective material being insulating and being placed individually on all the wires. This configuration is capable of preventing a short circuit of the wire because the protective material is present in place of an insulation sheath of the wire even if the sheath is damaged.

The protective material in the wire harness according to a preferred embodiment may be made of high-strength fiber. This configuration can achieve a thin and strong reinforcing material, thereby capable of providing enhanced protection for the wires and preventing difficulty in passing the wires through the pipe.

The protective material in the wire harness according to a preferred embodiment may be placed on a portion of the wire that is located on an inner side of an edge of the pipe. In this configuration, the protective material protects a portion of the wire that contacts the edge of the pipe; thus, a protector for covering the edge of the pipe can be eliminated.

First Embodiment

An embodiment is described below in detail with reference to FIGS. 1 to 6.

A wire harness 10 according to the present embodiment is a high-voltage wire harness that electrically connects devices M1 and M2 that may be a battery, an inverter, or other devices that constitute an electric drive system installed in an electrically driven vehicle, such as a hybrid car or an electric car. Routed under a floor of a vehicle body outside a body frame, the wire harness 10 connects the device M1 located in a front portion of the body to the device M2 located in a rear portion of the body.

The wire harness 10 is a pipe harness that includes a pipe 12 that is made of metal for protecting a wire 11 from external damage due to flying stones or the like and for blocking electromagnetic noise to prevent adverse effects on the surroundings of the pipe 12. The wire harness 10 also includes a plurality of wires 11 (two wires in the present embodiment) disposed in the pipe 12. Each of the wires 11 has a predefined portion (hereinafter referred to as protected portion 13) that is located within the pipe 12 and is surrounded and thereby protected by a protective material 14. The protective material 14 is described in detail below.

Figure 2:
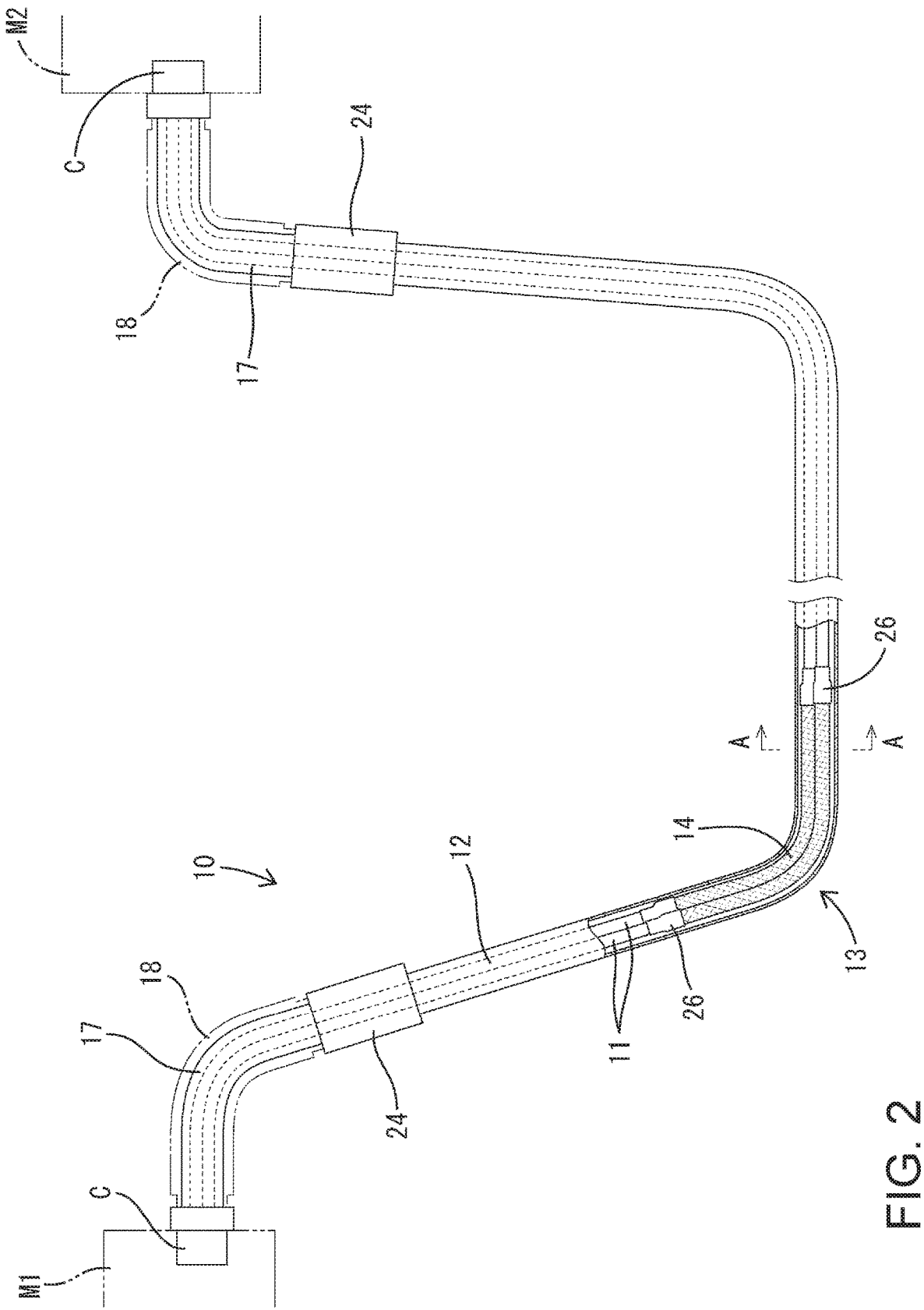
FIG. 2 is a partial cutaway view of the wire harness as installed in the vehicle, showing how protective materials are locally attached to the wire harness.
Figure 3:
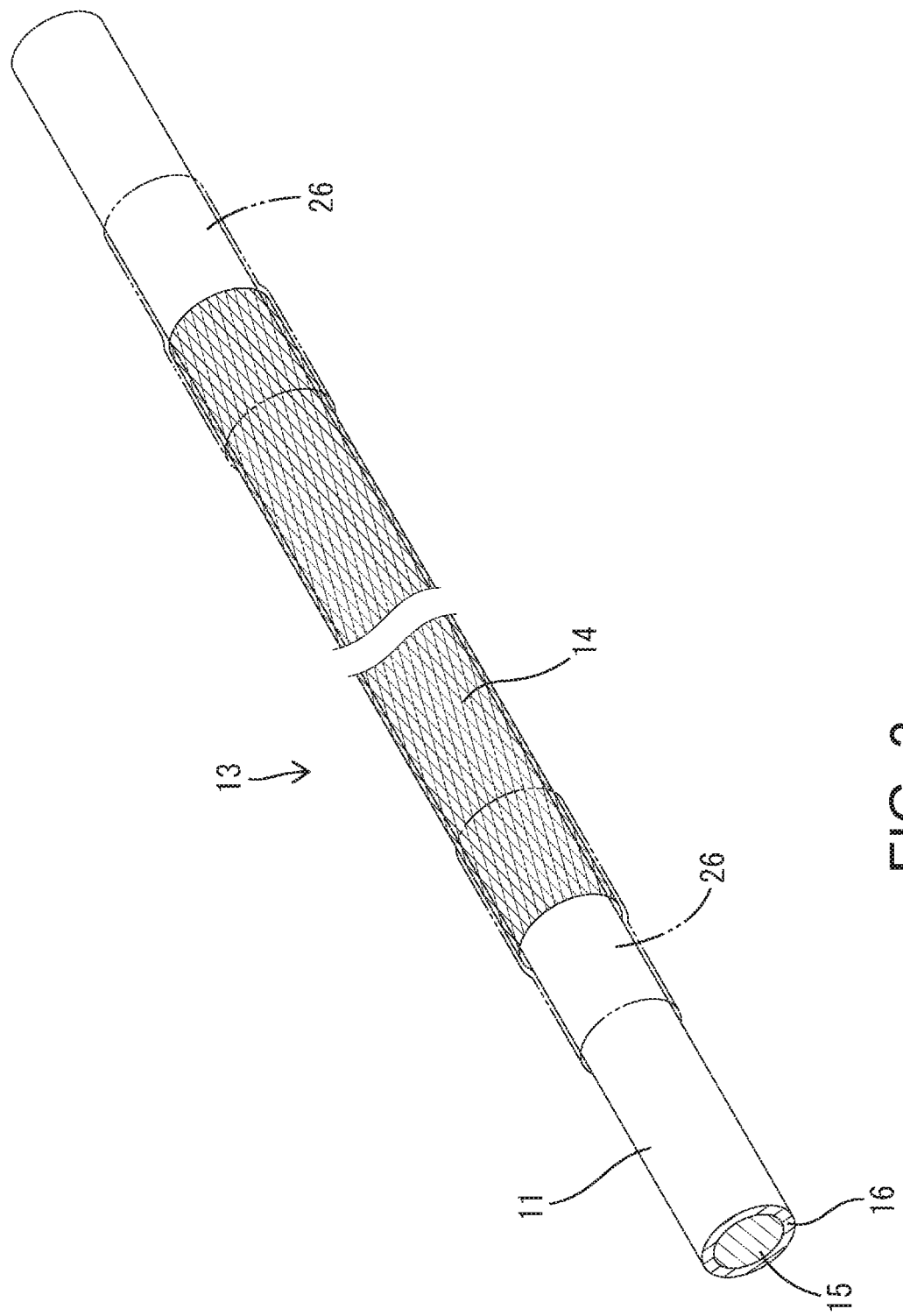
FIG. 3 is a partially enlarged perspective view of the protective material as attached on a wire.
Figure 4:
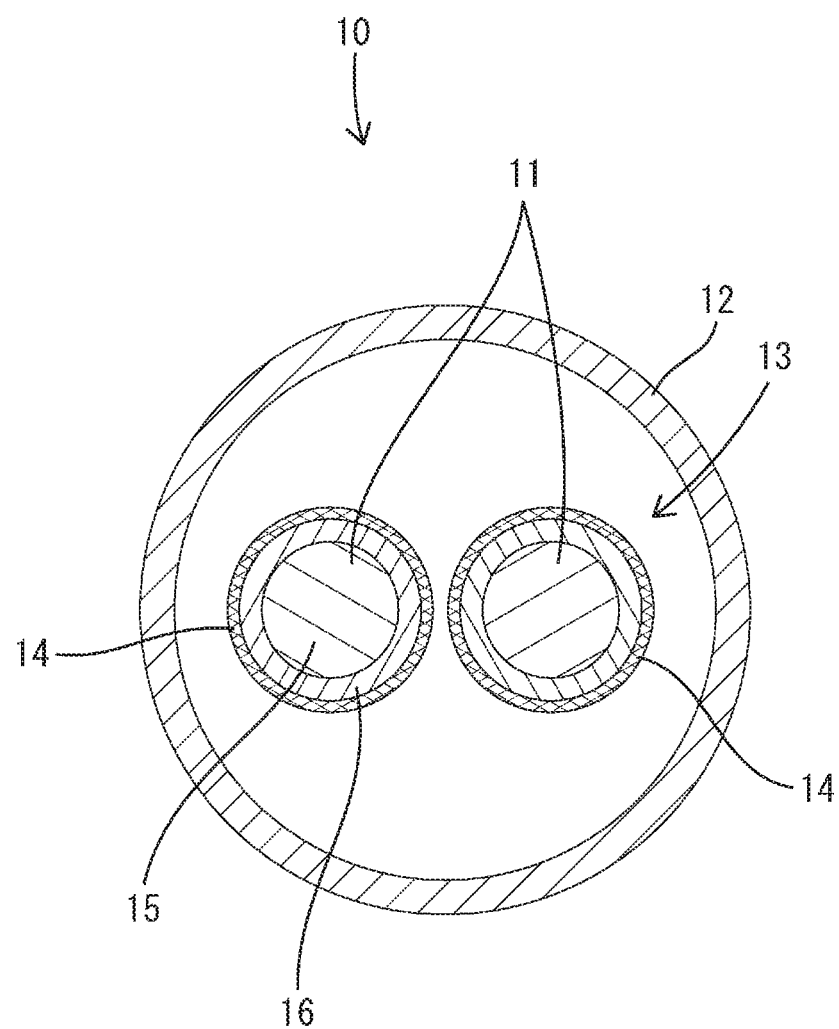
FIG. 4 is a sectional view of the wire harness with wires surrounded by the protective materials, the view corresponding to a cross section taken along line A-A in FIG. 2.

As illustrated in FIG. 3, the wire 11 is a widely known type of wire that includes a conductor 15 surrounded by an insulation sheath 16 and has a circular cross section. The wire 11 is a high-voltage wire with the insulation sheath 16 colored orange. As illustrated in FIG. 2, the two wires 11 are disposed in the pipe 12 together, with both end portions of each of the wires 11 protruding from the pipe 12. The portions of the wires 11 that protrude from the pipe 12 are surrounded by a shield material 17 and a covering material 18 that have flexibility. A terminal fitting (not shown) is connected to each of the end portions of the wires 11. The terminal fittings are housed in connectors C that are respectively connectable to one of the devices M1 and M2.

Figure 5:
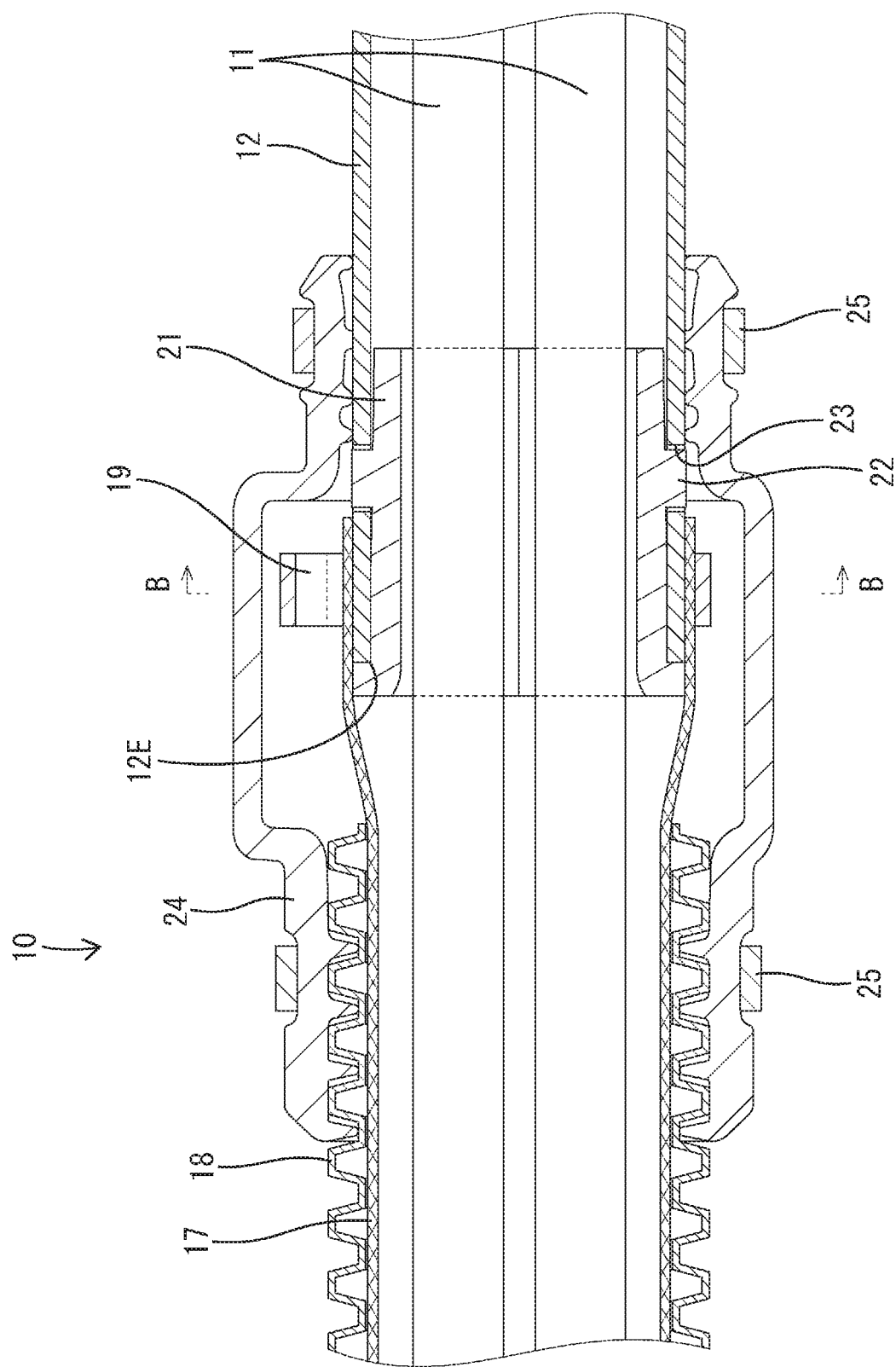
FIG. 5 is a partially enlarged sectional view of the wire harness, showing a configuration of an end portion of a pipe.
Figure 6:
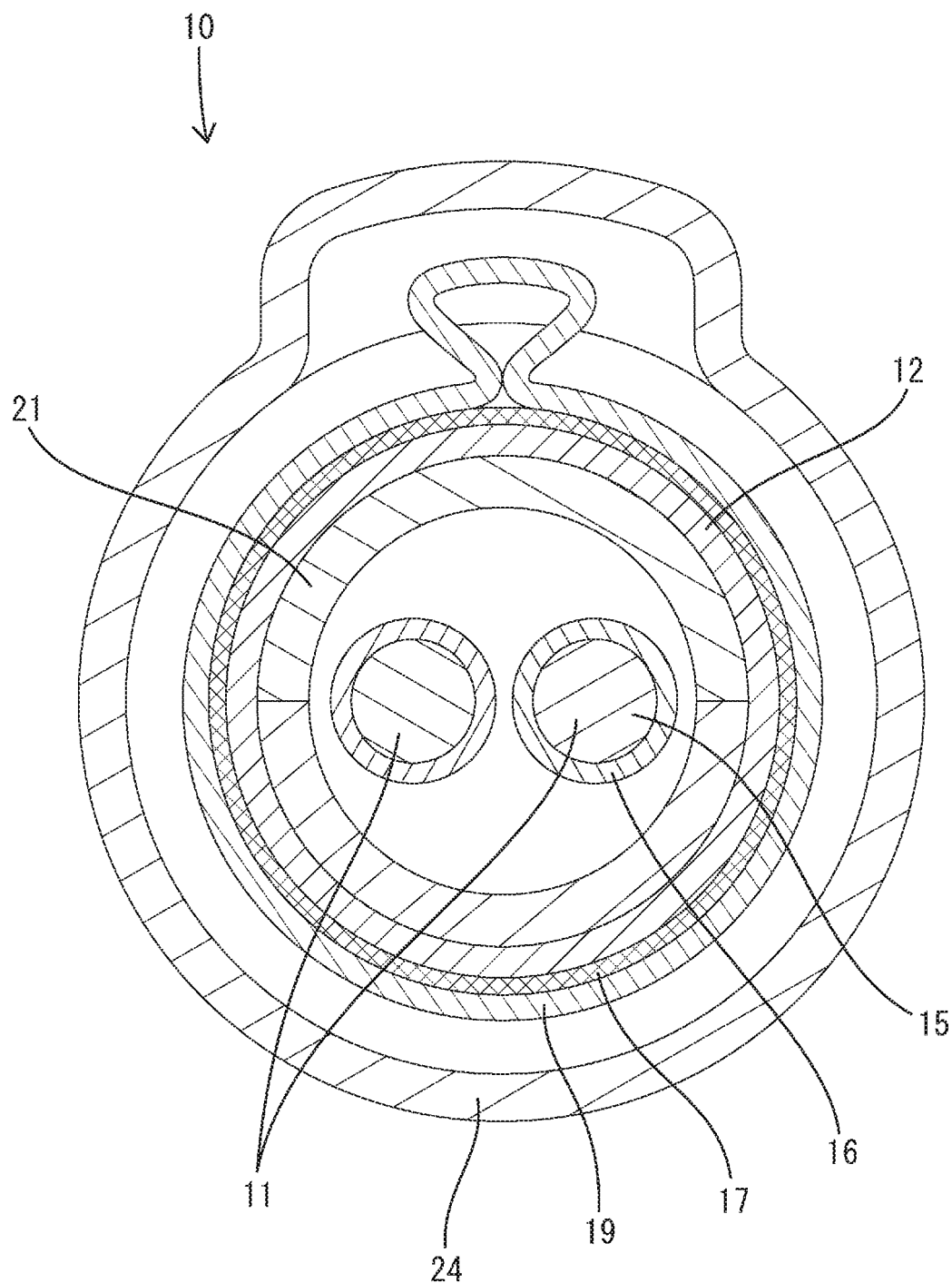
FIG. 6 is a sectional view of the wire harness, showing the configuration of the end portion of the pipe, the view corresponding to a cross section taken along line B-B in FIG. 5.

The shield material 17 is, for example, braided wires made by braiding metal fine lines into a tubular shape. The covering material 18 is, for example, a corrugated tube. As illustrated in FIG. 5, an end portion of the shield material 17 is secured on an outer circumference side of the pipe 12, in a manner that can allow conduction, by a clamp ring 19 made of metal.

The pipe 12 is an elongated metal pipe having a circular cross section and is bent in three-dimensional directions in accordance with the layout of components such as the devices M1 and M2. In the present embodiment, the pipe 12 is an aluminum pipe painted orange, having a total length of about 2.5 m. A major length of the pipe 12 is placed at a middle portion, in a width direction, of an underside of the floor of the vehicle body, with the end portions of the pipe 12 routed through the cabin of the vehicle to locations near the devices M1 and M2.

As illustrated in FIG. 5, a protector 21 is attached on each of the end portions of the pipe 12. The protector 21 is a resin molding for preventing the wires 11 from contacting an edge 12E of the pipe 12 and thereby preventing damage to the insulation sheaths 16 of the wires 11. The protector 21 has a tubular shape fittable on an inside of the pipe 12 and is secured thereon with locking protrusions 22 provided on an outer circumferential surface of the protector 21 engaging locking holes 23 formed through the pipe 12. The protector 21 is present along the entire circumference of the edge 12E located at an opening of the pipe 12.

A grommet 24, made of rubber, is attached from the covering material 18, which surrounds the shield material 17 for protection, to the end portion of the pipe 12, thereby preventing entry of water into the pipe 12. The grommet 24 is secured to the covering material 18 and the pipe 12 by fastening a tie 25 on the grommet 24.

The protective material 14 provides insulation and has high strength, excellent impact resistance, and good flexibility. The protective material 14 is made by braiding high-strength fiber (for example, aramid fiber or other types of high-strength fiber having excellent impact resistance and cut resistance) into a tubular shape. The total length of the protective material 14, approximately 20 cm in the present embodiment, is much shorter than that of the pipe 12. The protective material 14 has an elongated tubular shape with its entire circumference closed and both ends open and is stretchable to some extent in its axial and width directions. The protective material 14 has an inner diameter equivalent to an outer diameter of the wire 11. The protective material 14 has a thickness equivalent to or smaller than that of the insulation sheath 16; the thickness of the protective material 14 is about 0.3 mm in the present embodiment. The thickness of the protective material 14 is smaller than that of the protector 21, thus eliminating the need to take measures such as increasing the diameter of the pipe 12.

The protective material 14 is provided individually on all the wires 11 disposed in the pipe 12. The protective material 14 is placed on the protected portion 13 of each of the wires 11; the protective materials 14 are in the same location on all the wires 11. The protected portion 13 is a known portion; in the present embodiment, it is a portion of the wire 11 that is likely to be damaged in the event of a side crash of the vehicle. The protected portion 13 is defined based on an assumption that a frame structure (not shown) near the pipe 12 is deformed due to the side crash, thereby hitting and damaging the pipe 12. As illustrated in FIG. 2, the protected portion 13 according to the present embodiment corresponds to a forward end portion of a length of the wire 11 that is routed along the underside of the floor; i.e., a bent portion directed upward from under the floor. The protective material 14 is secured to the protected portion 13 of the wire 11 by winding a tape 26 around end portions of the protective material 14 in the axial direction.

An example assembly process for the wire harness 10 according to the present embodiment is described below.

The protective material 14 is attached on the protected portion 13 of each of the wires 11. To attach the protective material 14 on the wire 11, the wire 11 is passed through one end of the protective material 14 and pulled out from the other end. The protective material 14 is then moved over the wire 11 to the position of the protected portion 13 and secured on the protected portion 13 by winding the tape 26 around the end portions of the protective material 14. This procedure is repeated until all the wires 11 are equipped with the protective material 14 on the respective protected portions 13.

Then, the wires 11 are inserted into the pipe 12. Specifically, the wires 11 to be inserted into the pipe 12 are collected and passed together through one end of the pipe 12 and pulled out from the other end. When the wires 11 are passed through the pipe 12, the protected portions 13 (i.e., the protective materials 14) are brought in contact with one of the protectors 21 located on the end portions of the pipe 12, causing some resistance. After passing the protector 21, the wires 11 are moved through the pipe 12 relatively smoothly.

Then, the connectors C are connected to the end portions of the wires 11. Specifically, the terminal fitting is connected to the end portion of the wire 11 protruding from the pipe 12. The terminal fitting is then inserted into one of the connectors C so as to be housed therein. The connectors C are connected to end portions of the wire harness 10 in this manner. Note that the shield materials 17 are clamped and the covering materials 18 and the grommets 24 are attached before the connectors C are connected.

Then, the pipe 12 is bent into a predefined shape. The wire harness 10 is provided with bends, following the layout of the vehicle body.

The assembly process for the wire harness 10 is completed in this manner.

When the assembled wire harness 10 is secured in place on the vehicle body, the protective materials 14 are in predefined positions of the vehicle body (near a portion of the frame structure that is likely to deform during a side crash). If the frame structure deforms and damages the pipe 12 during a side crash, the protective materials 14 protect the wires 11 in the location where the pipe 12 is damaged, and are thus capable of preventing damage to the wires 11. Even if the insulation sheath 16, which is surrounded by the protective material 14, is damaged in a severe collision, the protective material 14 can prevent a short circuit of the wire 11 because the protective material 14, providing insulation, surrounds the conductor 15.

Operation and effect of the embodiment having a configuration as described above are described below.

In the wire harness 10 according to the present embodiment, the wire 11 disposed in the pipe 12 has the protected portion 13 within the pipe 12, the protected portion 13 being a portion that is likely to be damaged in the event of a collision of a vehicle. The protected portion 13 is surrounded and thereby protected by the protective material 14. This configuration is thus capable of protecting the wire 11 even if the pipe 12 is damaged. This configuration is also capable of avoiding the diameter of the pipe 12 being increased for the process of passing the wire 11 through the pipe 12, because the wire 11 in this configuration is passed through the pipe 12 with greater ease than a wire 11 surrounded by a protective material 14 along the entire length of the wire 11.

Additionally, the protective material 14 provides insulation and is placed individually on the two wires 11. This configuration is capable of preventing a short circuit of the wire 11 because the protective material 14 is present in place of the insulation sheath 16 of the wire 11 if the insulation sheath 16 is damaged.

Moreover, the protective material 14 is made of high-strength fiber. This configuration can achieve a thin and strong reinforcing material, thereby capable of providing enhanced protection for the wires 11 and preventing difficulty in passing the wires 11 through the pipe 12.

Second Embodiment

Figure 7:
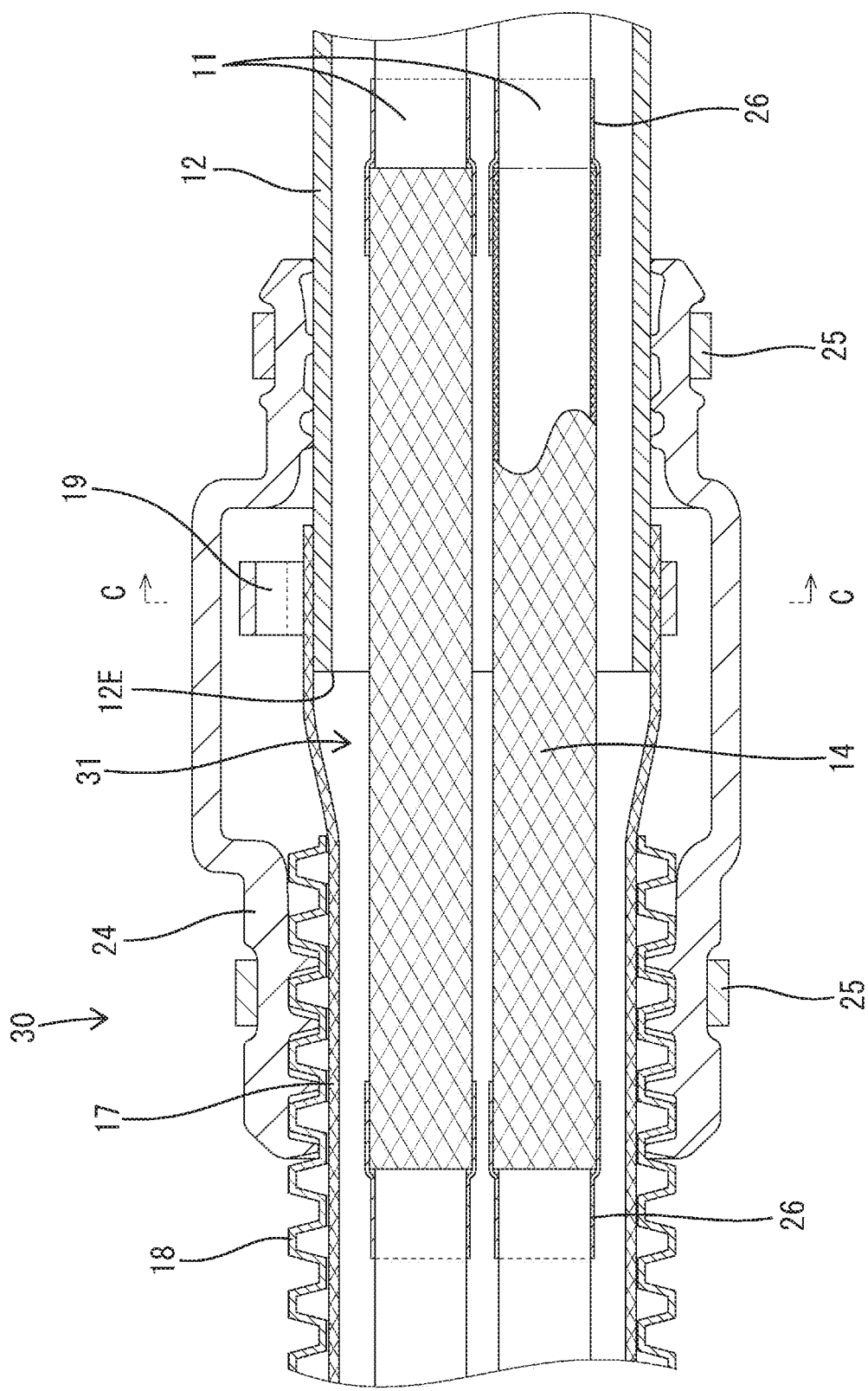
FIG. 7 is a partially enlarged sectional view of a wire harness according to a second embodiment, showing a configuration of an end portion of a pipe.
Figure 8:
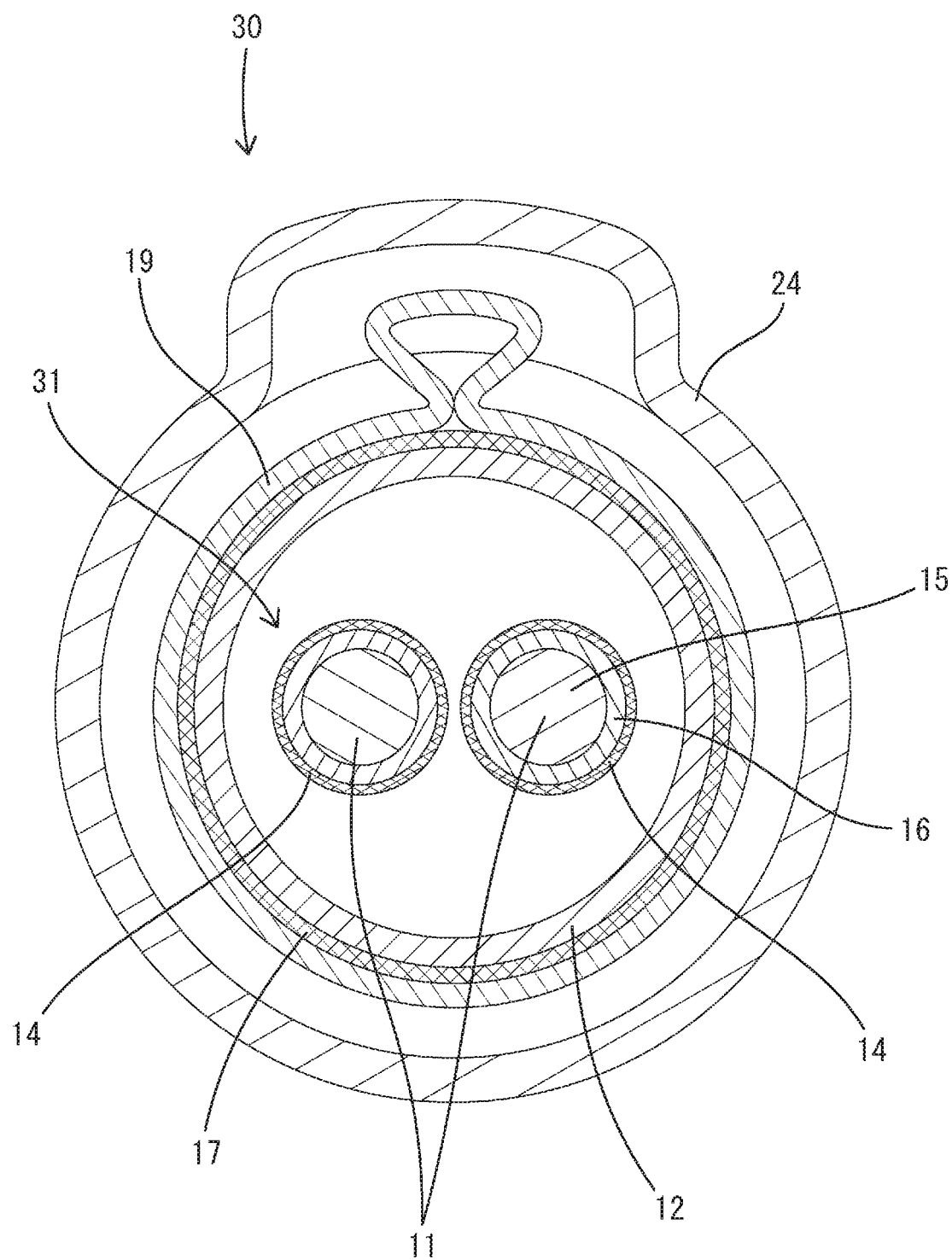
FIG. 8 is a sectional view of the wire harness, showing the configuration of the end portion of the pipe, the view corresponding to a cross section taken along line C-C in FIG. 7.

A wire harness 30 according to a second embodiment is described below with reference to FIGS. 7 and 8.

The wire harness 30 according to the present embodiment is different from the wire harness according to the first embodiment in that a protective material 14 is placed on a portion of a wire 11, the portion being located on an inner side of a pipe 12 with respect to an edge 12E of the pipe 12 (hereinafter referred to as pipe-edge protected portion 31). Structural features similar to those in the first embodiment are designated with identical symbols, and their description is omitted.

As in the case with the first embodiment, the wire harness 30 according to the present embodiment includes two wires 11 disposed in the pipe 12, and a protected portion 13 of each of the wires 11 is surrounded and thereby protected by a protective material 14, the protected portion 13 being located within the pipe 12. The protective material 14 is made of high-strength fiber, provides insulation, and is placed individually on the two wires 11, as in the first embodiment.

The protective material 14 is also placed on a portion of the wire 11, the portion being located on the inner side of the pipe 12 with respect to the edge 12E (i.e., the pipe-edge protected portion 31), in addition to the protected portion 13. The protective material 14 here is the same as that attached on the protected portion 13. As illustrated in FIG. 7, the protective material 14 is placed so as to straddle an outer side of the pipe and the inner side of the pipe 12, with the edge 12E of the pipe 12 located at a middle portion of the protective material 14 in the axial direction.

As described above, the present embodiment includes the protective material 14 on the protected portion 13, thereby capable of protecting the wire 11 even if the pipe 12 is damaged due to a collision of a vehicle or other reasons, as in the first embodiment. The present embodiment also includes the protective material 14 on the portion of each of the wires 11, the portion being located on the inner side of the pipe 12 with respect to the edge 12E. If the wire 11 contacts the edge 12E of the pipe 12 repeatedly due to vehicle vibration, displacement of the wire 11 in the pipe 12, or other factors, a contacting portion of the wire 11 is protected by the protective material 14. The protector 21 for covering the edge 12E of the pipe 12 can thus be eliminated.

Other Embodiments

The present invention is not limited to the embodiments described above with reference to the drawings; for example, the following embodiments are also included in the technical scope of the present invention.

(1) While the protective material 14 is made by braiding high-strength fiber into a tubular shape in the embodiments described above, this is not a limitation. The protective material may also be a material that locally surrounds and can thereby protect a wire and may be, for instance, a heat-shrinkable tube.

(2) While the protective material 14 is made by braiding high-strength fiber in the embodiments described above, this is not a limitation. The protective material may also be a nonwoven fabric or may be made by molding a resin material, PET resin, or the like containing a high-strength fiber.

(3) While the protective material 14 has a tubular shape in the embodiments described above, this is not a limitation. The protective material may also have, for instance, a sheet shape.

(4) While the pipe 12 is made of metal in the embodiments described above, this is not a limitation. The pipe may also be made of resin.

(5) While the protective material 14 is secured on the wire 11 by winding the tape 26 on the protective material 14 in the embodiments described above, this is not a limitation. The protective material 14 may also be secured by heat sealing.

(6) While the wires 11 disposed in the pipe 12 are high-voltage wires in the embodiments described above, this is not a limitation. The wires disposed in the pipe may also be low-voltage wires or both a high-voltage wire and a low-voltage wire. If a high-voltage wire and a low-voltage wire are both present in the pipe, the protective material may be placed on, for example, only the high-voltage wire to prevent a short circuit of the high-voltage wire.

(7) While the protective material 14 is provided individually on the wires 11 in the embodiments described above, this is not a limitation. The protective material 14 may also surround multiple wires together.

(8) While the protected portion 13 is a portion that is likely to be damaged in the event of a side crash of a vehicle in the embodiments described above, this is not a limitation. The protected portion 13 may also be a portion that is likely to be damaged in the event of, for instance, a frontal crash or a rear-end crash, or upon any other impact in a non-collision event.

LIST OF REFERENCE NUMERALS 10, 30 Wire harness
11 Wire
12 Pipe
13 Protected portion (predefined portion disposed within the pipe)
14 Protective material
31 Pipe-edge protected portion (portion located on the inner side of the pipe with respect to the edge)

The invention claimed is:

1. A wire harness, comprising:
   a wire disposed in a pipe; and
   a protective material that is made of braided high-strength fiber and that surrounds and protects a predefined portion of the wire, the predefined portion being disposed within the pipe.

2. The wire harness according to claim 1, comprising a plurality of wires disposed in the pipe,
   the protective material being insulating and being placed individually on the wires.

3. The wire harness according to claim 1, wherein the protective material is disposed on a portion of the wire that is located on an inner side of an edge of the pipe.

4. A wire harness, comprising:
   a pipe including an inner circumferential surface;
   a wire disposed in the pipe; and
   a protective material surrounding and protecting a predefined portion of the wire that is disposed within the pipe, a vacant space being present between an outer circumferential surface of the protective material and the inner circumferential surface of the pipe.

5. A wire harness, comprising:
   a pipe having an inner diameter;
   a wire disposed in the pipe; and
   a protective material surrounding and protecting a predefined portion of the wire that is disposed within the pipe, wherein
   an outer diameter of the protective material is smaller than the inner diameter of the pipe, and a vacant space is present between the protective material and the pipe in a radial direction of the pipe.

* * * * *